United States Patent
Armstrong

(10) Patent No.: US 9,407,875 B2
(45) Date of Patent: Aug. 2, 2016

(54) SECURE VIDEO DISTRIBUTION

(75) Inventor: Alan Armstrong, Los Altos, CA (US)

(73) Assignee: Marvell World Trade LTD., St. Michael (BB)

( * ) Notice: Subject to any disclaimer, the term of this patent is extended or adjusted under 35 U.S.C. 154(b) by 1044 days.

(21) Appl. No.: 13/303,926

(22) Filed: Nov. 23, 2011

(65) Prior Publication Data

US 2012/0070127 A1 Mar. 22, 2012

Related U.S. Application Data

(62) Division of application No. 11/586,860, filed on Oct. 26, 2006, now abandoned.

(51) Int. Cl.
| | | |
|---|---|---|
| H04N 9/80 | (2006.01) | |
| H04N 7/167 | (2011.01) | |
| H04N 21/436 | (2011.01) | |
| H04N 21/4367 | (2011.01) | |
| H04N 21/4405 | (2011.01) | |
| H04N 21/4623 | (2011.01) | |
| H04L 29/06 | (2006.01) | |

(52) U.S. Cl.
CPC ......... *H04N 7/1675* (2013.01); *H04N 21/4367* (2013.01); *H04N 21/43622* (2013.01); *H04N 21/4405* (2013.01); *H04N 21/4623* (2013.01); *H04L 63/0428* (2013.01)

(58) Field of Classification Search
None
See application file for complete search history.

(56) References Cited

U.S. PATENT DOCUMENTS

| | | |
|---|---|---|
| 5,870,477 A | 2/1999 | Sasaki et al. |
| 6,363,357 B1 | 3/2002 | Rosenberg et al. |
| 6,526,144 B2 | 2/2003 | Markandey et al. |
| 6,961,430 B1 | 11/2005 | Gaske et al. |
| 7,301,944 B1 | 11/2007 | Redmond |
| 7,702,592 B2 | 4/2010 | Taylor |
| 7,779,058 B2 | 8/2010 | Shea |
| 7,933,838 B2 | 4/2011 | Ye |
| 2002/0085707 A1* | 7/2002 | Turnbull .................. 379/406.07 |
| 2002/0178366 A1* | 11/2002 | Ofir ...................... G06F 21/6245 713/182 |
| 2003/0021420 A1* | 1/2003 | Kamperman et al. ........ 380/277 |

(Continued)

FOREIGN PATENT DOCUMENTS

| | | |
|---|---|---|
| EP | 1631059 | 1/2006 |
| JP | 2005-141413 | 11/2003 |
| JP | 2006-67575 | 10/2004 |

OTHER PUBLICATIONS

Summary of Notice of Reasons for Rejection for JP Application No. 2009-534643, Ryuka IP Law Firm, Oct. 2, 2012, 4 pages.

(Continued)

*Primary Examiner* — Hung Dang
*Assistant Examiner* — Sunghyoun Park

(57) ABSTRACT

An apparatus includes an input circuit, a storage device, a retrieve circuit, a decrypt circuit, and an output circuit. The input circuit is configured to receive packets of encrypted encoded video data from a first network. The storage device is preauthorized by the first network to store the encrypted encoded video data. The retrieve circuit is configured to retrieve the encrypted encoded video data from the storage device for decryption. The decrypt circuit is configured to decrypt the encrypted encoded video data without further authorization. The output circuit is configured to transmit a signal representing the encrypted encoded video data while the retrieve circuit retrieves the encrypted encoded video data from the storage device.

18 Claims, 10 Drawing Sheets

(56) References Cited

U.S. PATENT DOCUMENTS

| | | | |
|---|---|---|---|
| 2003/0070174 A1 | 4/2003 | Solomon | |
| 2003/0206635 A1* | 11/2003 | Morley | G11B 27/031 380/269 |
| 2004/0125957 A1* | 7/2004 | Rauber et al. | 380/259 |
| 2005/0120380 A1* | 6/2005 | Wolfe | 725/100 |
| 2005/0144141 A1 | 6/2005 | Nagao | |
| 2005/0177853 A1 | 8/2005 | Williams et al. | |
| 2005/0220440 A1* | 10/2005 | Liebhold | G11B 27/105 386/241 |
| 2006/0036611 A1* | 2/2006 | Rothschild | G06F 21/10 |
| 2006/0036742 A1* | 2/2006 | Yoshimine | G06F 17/3089 709/227 |
| 2006/0117379 A1 | 6/2006 | Bennett et al. | |
| 2008/0144821 A1* | 6/2008 | Armstrong | H04N 7/1675 380/216 |
| 2009/0052661 A1 | 2/2009 | Fahrny et al. | |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 532 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 92 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 (Supplement to ANSI/IEEE Std 802.11-1999 (Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/ MAN Standards Committee of the IEEE Computer Society; 69 pages.

802.11n; IEEE P802.11-04/0889r6; Wireless LANs, TGn Sync Proposal Technical Specification; 132 pages.

IEEE Std 802.16/2004 (Revision of IEEE Std 802.16/2001) IEEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 894 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14; 26 pages.

The International Search Report and Written Opinion of the International Searching Authority, or the Declaration dated Jun. 18, 2006, for International Application No. PCT/US2007/022583, filed Oct. 25, 2007; 12 pages.

* cited by examiner

US 9,407,875 B2

SECURE VIDEO DISTRIBUTION

CROSS-REFERENCE TO RELATED APPLICATIONS

This application is a divisional of U.S. patent application Ser. No. 11/586,860 filed on Oct. 26, 2006. The disclosure of the above application is incorporated herein by reference in its entirety.

BACKGROUND

The present invention relates generally to data communications. More particularly, the present invention relates to secure video distribution.

SUMMARY

In general, in one aspect, the invention features an apparatus comprising: an input circuit to receive packets of encrypted encoded video data from a network; a storage device to store the encrypted encoded video data; a retrieve circuit to retrieve the encrypted encoded video data from the storage device; a decrypt circuit to decrypt the encrypted encoded video data into encoded video data while the retrieve circuit retrieves the encrypted encoded video data from the storage device; and an output circuit to transmit a signal representing the encoded video data while the decrypt circuit decrypts the encrypted encoded video data.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the storage device does not store any substantial portion of the encoded video data. In some embodiments, the video data represents one or more videos, the apparatus further comprising: a queue circuit to determine a number of the videos stored on the storage device; and a further output circuit to transmit a message to the network, the message representing the number of the videos stored on the storage device. Some embodiments comprise a control circuit to receive a command to discard one of the videos stored on the storage device; wherein the storage device discards the one of the videos in response to the control circuit; wherein the queue circuit then determines the current number of the videos stored on the storage device; and wherein the further output circuit then transmits a message to the network, the message representing the current number of the videos stored on the storage device. In some embodiments, the network comprises the Internet. Some embodiments comprise a further input circuit to receive the signal representing the encoded video data; a decode circuit to decode the encoded video data into video data while the further input circuit receives the signal representing the encoded video data; and a further output circuit to output a multimedia signal representing the video data while the decode circuit decodes the encoded video data. In some embodiments, the apparatus does not store any substantial portion of the video data or the encoded video data. In some embodiments, the multimedia signal comprises a high-definition television signal. Some embodiments comprise a first network port to receive the packets of encrypted encoded video data and first other data from the network, and to transmit second other data to the network; a second network port to transmit the first other data to a local network, and to receive the second other data from the local network; and a switch to pass the packets of encrypted encoded video data from the first network port to the input circuit, and to pass the first and second other data between the first and second network ports. In some embodiments, the first network port receives first voice data and transmits second voice data, further comprising: an analog telephone interface to transmit first analog telephone signals representing the first voice data, and to receive second analog telephone signals representing the second voice data; wherein the switch passes the first and second voice data between the first network port and the analog telephone interface. In some embodiments, the signal representing the encoded video data is a wireless signal which is compliant with at least one standard selected from the group consisting of IEEE standards 802.11, 802.11a, 802.11b, 802.11g, 802.11n, 802.16, and 802.20.

In general, in one aspect, the invention features an apparatus comprising: input means for receiving packets of encrypted encoded video data from a network; storage means for storing the encrypted encoded video data; retrieve means for retrieving the encrypted encoded video data from the storage means; decrypt means for decrypting the encrypted encoded video data into encoded video data while the retrieve means retrieves the encrypted encoded video data from the storage means; and output means for transmitting a signal representing the encoded video data while the decrypt means decrypts the encrypted encoded video data.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the storage means does not store any substantial portion of the encoded video data. In some embodiments, the video data represents one or more videos, the apparatus further comprising: queue means for determining a number of the videos stored on the storage means; and further output means for transmitting a message to the network, the message representing the number of the videos stored on the storage means. Some embodiments comprise control means for receiving a command to discard one of the videos stored on the storage means; wherein the storage means discards the one of the videos in response to the control means; wherein the queue means then determines the current number of the videos stored on the storage means; and wherein the further output means then transmits a message to the network, the message representing the current number of the videos stored on the storage means. In some embodiments, the network comprises the Internet. Some embodiments comprise further input means for receiving the signal representing the encoded video data; decode means for decoding the encoded video data into video data while the further input means receives the signal representing the encoded video data; and further output means for outputting a multimedia signal representing the video data while the decode means decodes the encoded video data. In some embodiments, the apparatus does not store any substantial portion of the video data or the encoded video data. In some embodiments, the multimedia signal comprises a high-definition television signal. Some embodiments comprise first network port means for receiving the packets of encrypted encoded video data and first other data from the network, and for transmitting second other data to the network; second network port means for transmitting the first other data to a local network, and for receiving the second other data from the local network; and switch means for passing the packets of encrypted encoded video data from the first network port means to the input means, and for passing the first and second other data between the first and second network port means. In some embodiments, the first network port means receives first voice data and transmits second voice data, further comprising: analog telephone interface means for transmitting first analog telephone signals representing the first voice data, and for receiving second analog telephone signals representing the second voice data; wherein the switch means passes the first and second voice data between the first network port means and the analog telephone interface means. In some embodiments, the signal representing the encoded video data is a wireless signal which is compliant with at least one standard selected from the group consisting of IEEE standards 802.11, 802.11a, 802.11b, 802.11g, 802.11n, 802.16, and 802.20.

In general, in one aspect, the invention features a method comprising: receiving packets of encrypted encoded video data from a network; storing the encrypted encoded video data on a storage device; retrieving the encrypted encoded video data from the storage device; decrypting the encrypted encoded video data into encoded video data while retrieving the encrypted encoded video data from the storage device; and transmitting a signal representing the encoded video data while decrypting the encrypted encoded video data.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the storage device does not store any substantial portion of the encoded video data. In some embodiments, the video data represents one or more videos, further comprising: determining a number of the videos stored on the storage device; and transmitting a message to the network, the message representing the number of the videos stored on the storage device. Some embodiments comprise receiving a command to discard one of the videos stored on the storage device; discarding the one of the videos in response to the command; determining the current number of the videos stored on the storage device; and transmitting a message to the network, the message representing the current number of the videos stored on the storage device. In some embodiments, the network comprises the Internet. Some embodiments comprise receiving the signal representing the encoded video data; decoding the encoded video data into video data while receiving the signal representing the encoded video data; and outputting a multimedia signal representing the video data while decoding the encoded video data. In some embodiments, the multimedia signal comprises a high-definition television signal. Some embodiments comprise receiving the packets of encrypted encoded video data and first other data from the network; transmitting second other data to the network; transmitting the first other data to a local network; receiving the second other data from the local network; passing the packets of encrypted encoded video data to the storage device; and passing the first and second other data between the network and the local network. Some embodiments comprise receiving first voice data from the network; transmitting second voice data to the network; transmitting first analog telephone signals representing the first voice data; and receiving second analog telephone signals representing the second voice data. In some embodiments, the signal representing the encoded video data is a wireless signal which is compliant with at least one standard selected from the group consisting of IEEE standards 802.11, 802.11a, 802.11b, 802.11g, 802.11n, 802.16, and 802.20.

In general, in one aspect, the invention features a computer program executable on a processor, comprising: instructions for storing encrypted encoded video data on a storage device, wherein the encrypted encoded video data is received in packets from a network; instructions for retrieving the encrypted encoded video data from the storage device; and instructions for decrypting the encrypted encoded video data into encoded video data while retrieving the encrypted encoded video data from the storage device; wherein a signal representing the encoded video data is transmitted while decrypting the encrypted encoded video data.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the storage device does not store any substantial portion of the encoded video data. In some embodiments, the video data represents one or more videos, further comprising: determining a number of the videos stored on the storage device; and transmitting a message to the network, the message representing the number of the videos stored on the storage device. Some embodiments comprise instructions for discarding one of the videos stored on the storage device in response to a received command to discard the one of the videos; instructions for determining the current number of the videos stored on the storage device; and instructions for transmitting a message to the network, the message representing the current number of the videos stored on the storage device. In some embodiments, the network comprises the Internet. Some embodiments comprise instructions for decoding the encoded video data into video data while receiving the signal representing the encoded video data; wherein a multimedia signal representing the video data is outputted while decoding the encoded video data. In some embodiments, the multimedia signal comprises a high-definition television signal. In some embodiments, the signal representing the encoded video data is a wireless signal which is compliant with at least one standard selected from the group consisting of IEEE standards 802.11, 802.11a, 802.11b, 802.11g, 802.11n, 802.16, and 802.20.

In general, in one aspect, the invention features an apparatus comprising: an input circuit to receive packets of encrypted encoded video data from a network; a storage device to store the encrypted encoded video data; a retrieve circuit to retrieve the encrypted encoded video data from the storage device; and an output circuit to transmit a signal representing the encrypted encoded video data while the retrieve circuit retrieves the encrypted encoded video data from the storage device.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the video data represents one or more videos, the apparatus further comprising: a queue circuit to determine a number of the videos stored on the storage device; and a further output circuit to transmit a message to the network, the message representing the number of the videos stored on the storage device. Some embodiments comprise a control circuit to receive a command to discard one of the videos stored on the storage device; wherein the storage device discards the one of the videos in response to the control circuit; wherein the queue circuit then determines the current number of the videos stored on the storage device; and wherein the further output circuit then transmits a message to the network, the message representing the current number of the videos stored on the storage device. In some embodiments, the network comprises the Internet. Some embodiments comprise a further input circuit to receive the signal representing the encrypted encoded video data; a decrypt circuit to decrypt the encrypted encoded video data into encoded video data while the further input circuit receives the signal representing the encrypted encoded video data; a decode circuit to decode the encoded video data into video data while the decrypt circuit decrypts the encoded video data; and a further output circuit to output a multimedia signal representing the video data while the decode circuit decodes the encoded video data. In some embodiments, the apparatus does not store any substantial portion of the video data or the encoded video data. In some embodiments, the multimedia signal comprises a high-definition television signal. Some embodiments comprise a first network port to receive the packets of encrypted encoded video data and first other data from the network, and to transmit second other data to the network; a second network port to transmit the first other data to a local network, and to receive the second other data from the local network; and a switch to pass the packets of encrypted encoded video data from the first network port to the input circuit, and to pass the first and second other data between the first and second network ports. In some embodiments, the first network port receives first voice data and transmits second voice data, the apparatus further comprising: an analog telephone interface to transmit first analog telephone signals representing the first voice data, and to receive second analog telephone signals representing the second voice data; wherein the switch passes the first and second voice data between the first network port and the analog telephone interface. In some embodiments, the signal representing the encrypted encoded video data is a wireless signal which is compliant with at least one standard selected from the group consisting of IEEE standards 802.11, 802.11a, 802.11b, 802.11g, 802.11n, 802.16, and 802.20.

In general, in one aspect, the invention features an apparatus comprising: input means for receiving packets of encrypted encoded video data from a network; storage means for storing the encrypted encoded video data; retrieve means for retrieving the encrypted encoded video data from the storage means; and output means for transmitting a signal representing the encrypted encoded video data while the retrieve means retrieves the encrypted encoded video data from the storage means.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the video data represents one or more videos, further comprising: queue means for determining a number of the videos stored on the storage means; and further output means for transmitting a message to the network, the message representing the number of the videos stored on the storage means. Some embodiments comprise control means for receiving a command to discard one of the videos stored on the storage means; wherein the storage means discards the one of the videos in response to the control means; wherein the queue means then determines the current number of the videos stored on the storage means; and wherein the further output means then transmits a message to the network, the message representing the current number of the videos stored on the storage means. In some embodiments, the network comprises the Internet. Some embodiments comprise further input means for receiving the signal representing the encrypted encoded video data; decrypt means for decrypting the encrypted encoded video data into encoded video data while the further input means receives the signal representing the encrypted encoded video data; decode means for decoding the encoded video data into video data while the decrypt means decrypts the encoded video data; and further output means for outputting a multimedia signal representing the video data while the decode means decodes the encoded video data. In some embodiments, the apparatus does not store any substantial portion of the video data or the encoded video data. In some embodiments, the multimedia signal comprises a high-definition television signal. Some embodiments comprise first network port means for receiving the packets of encrypted encoded video data and first other data from the network, and for transmitting second other data to the network; second network port means for transmitting the first other data to a local network, and for receiving the second other data from the local network; and switch means for passing the packets of encrypted encoded video data from the first network port means to the input means, and for passing the first and second other data between the first and second network port means. In some embodiments, the first network port means receives first voice data and transmits second voice data, further comprising: analog telephone interface means for transmitting first analog telephone signals representing the first voice data, and for receiving second analog telephone signals representing the second voice data; wherein the switch means passes the first and second voice data between the first network port means and the analog telephone interface means. In some embodiments, the signal representing the encrypted encoded video data is a wireless signal which is compliant with at least one standard selected from the group consisting of IEEE standards 802.11, 802.11a, 802.11b, 802.11g, 802.11n, 802.16, and 802.20.

In general, in one aspect, the invention features a method comprising: receiving packets of encrypted encoded video data from a network; storing the encrypted encoded video data on a storage device; retrieving the encrypted encoded video data from the storage device; and transmitting a signal representing the encrypted encoded video data while retrieving the encrypted encoded video data from the storage device.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the video data represents one or more videos, the method further comprising: determining a number of the videos stored on the storage device; and transmitting a message to the network, the message representing the number of the videos stored on the storage device. Some embodiments comprise receiving a command to discard one of the videos stored on the storage device; discarding the one of the videos in response to the command; determining the current number of the videos stored on the storage device; and transmitting a message to the network, the message representing the current number of the videos stored on the storage device. In some embodiments, the network comprises the Internet. Some embodiments comprise receiving the signal representing the encrypted encoded video data; decrypting the encrypted encoded video data into encoded video data while receiving the signal representing the encrypted encoded video data; decoding the encoded video data into video data while decrypting the encoded video data; and outputting a multimedia signal representing the video data while decoding the encoded video data. In some embodiments, the multimedia signal comprises a high-definition television signal. Some embodiments comprise receiving the packets of encrypted encoded video data and first other data from the network; transmitting second other data to the network; transmitting the first other data to a local network; receiving the second other data from the local network; passing the packets of encrypted encoded video data from network to the storage device; and passing the first and second other data between the network and the local network. Some embodiments comprise receiving first voice data from the network; transmitting second voice data to the network; transmitting first analog telephone signals representing the first voice data; and receiving second analog telephone signals representing the second voice data. In some embodiments, the signal representing the encoded video data is a wireless signal which is compliant with at least one standard selected from the group consisting of IEEE standards 802.11, 802.11a, 802.11b, 802.11g, 802.11n, 802.16, and 802.20.

In general, in one aspect, the invention features a computer program executable on a processor, comprising: instructions for storing encrypted encoded video data on a storage device, wherein the encrypted encoded video data is received in packets from a network; and instructions for retrieving the encrypted encoded video data from the storage device; and wherein a signal representing the encrypted encoded video data is transmitted while retrieving the encrypted encoded video data from the storage device.

In some embodiments, the packets of encrypted encoded video data comprise Internet Protocol packets of the encrypted encoded video data. In some embodiments, the packets of encrypted encoded video data comprise Ethernet packets of the encrypted encoded video data. Some embodiments comprise, wherein the video data represents one or more videos, instructions for determining a number of the videos stored on the storage device; and instructions for transmitting a message to the network, the message representing the number of the videos stored on the storage device. Some embodiments comprise instructions for discarding one of the videos stored on the storage device in response to a received command; instructions for determining the current number of the videos stored on the storage device; and instructions for transmitting a message to the network, the message representing the current number of the videos stored on the storage device. In some embodiments, the network comprises the Internet. Some embodiments comprise instructions for decrypting the encrypted encoded video data into encoded video data while receiving a signal representing the encrypted encoded video data; and instructions for decoding the encoded video data into video data while decrypting the encoded video data; wherein a multimedia signal representing the video data is outputted while decoding the encoded video data. In some embodiments, the multimedia signal comprises a high-definition television signal. In some embodiments, the signal representing the encoded video data is a wireless signal which is compliant with at least one standard selected from the group consisting of IEEE standards 802.11, 802.11a, 802.11b, 802.11g, 802.11n, 802.16, and 802.20.

In general, in one aspect, the invention features an apparatus comprising: an input circuit to receive packets of encrypted encoded video data from a network; a storage device to store the encrypted encoded video data; a retrieve circuit to retrieve the encrypted encoded video data from the storage device; a decrypt circuit to decrypt the encrypted encoded video data into encoded video data while the retrieve circuit retrieves the encrypted encoded video data from the storage device; a decode circuit to decode the encoded video data into video data while the decrypt circuit decrypts the encrypted encoded video data; and an output circuit to output a multimedia signal representing the video data while the decode circuit decodes the encoded video data.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the storage device does not store any substantial portion of the encoded video data or the video data. Some embodiments comprise, wherein the video data represents one or more videos, a queue circuit to determine a number of the videos stored on the storage device; and a further output circuit to transmit a message to the network, the message representing the number of the videos stored on the storage device. Some embodiments comprise a control circuit to receive a command to discard one of the videos stored on the storage device; wherein the storage device discards the one of the videos in response to the control circuit; wherein the queue circuit then determines the current number of the videos stored on the storage device; and wherein the further output circuit then transmits a message to the network, the message representing the current number of the videos stored on the storage device. In some embodiments, the network comprises the Internet. In some embodiments, the multimedia signal comprises a high-definition television signal. Some embodiments comprise a first network port to receive the packets of encrypted encoded video data and first other data from the network, and to transmit second other data to the network; a second network port to transmit the first other data to a local network, and to receive the second other data from the local network; and a switch to pass the packets of encrypted encoded video data from the first network port to the input circuit, and to pass the first and second other data between the first and second network ports. Some embodiments comprise, wherein the first network port receives first voice data and transmits second voice data, an analog telephone interface to transmit first analog telephone signals representing the first voice data, and to receive second analog telephone signals representing the second voice data; wherein the switch passes the first and second voice data between the first network port and the analog telephone interface.

In general, in one aspect, the invention features an apparatus comprising: input means for receiving packets of encrypted encoded video data from a network; storage means for storing the encrypted encoded video data; retrieve means for retrieving the encrypted encoded video data from the storage means; decrypt means for decrypting the encrypted encoded video data into encoded video data while the retrieve means retrieves the encrypted encoded video data from the storage means; decode means for decoding the encoded video data into video data while the decrypt means decrypts the encrypted encoded video data; and output means for outputting a multimedia signal representing the video data while the decode means decodes the encoded video data.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the storage means does not store any substantial portion of the encoded video data or the video data. Some embodiments comprise, wherein the video data represents one or more videos, queue means for determining a number of the videos stored on the storage means; and further output means for transmitting a message to the network, the message representing the number of the videos stored on the storage means. Some embodiments comprise control means for receiving a command to discard one of the videos stored on the storage means; wherein the storage means discards the one of the videos in response to the control circuit; wherein the queue means then determines the current number of the videos stored on the storage means; and wherein the further output means then transmits a message to the network, the message representing the current number of the videos stored on the storage means. In some embodiments, the network comprises the Internet. In some embodiments, the multimedia signal comprises a high-definition television signal. Some embodiments comprise first network port means for receiving the packets of encrypted encoded video data and first other data from the network, and for transmitting second other data to the network; second network port means for transmitting the first other data to a local network, and for receiving the second other data from the local network; and switch means for passing the packets of encrypted encoded video data from the first network port means to the input means, and for passing the first and second other data between the first and second network port means. Some embodiments comprise, wherein the first network port means receives first voice data and transmits second voice data, analog telephone interface means for transmitting first analog telephone signals representing the first voice data, and for receiving second analog telephone signals representing the second voice data; wherein the switch means passes the first and second voice data between the first network port means and the analog telephone interface means.

In general, in one aspect, the invention features a method comprising: receiving packets of encrypted encoded video data from a network; storing the encrypted encoded video data on a storage device; retrieving the encrypted encoded video data from the storage device; decrypting the encrypted encoded video data into encoded video data while retrieving the encrypted encoded video data from the storage device; decoding the encoded video data into video data while decrypting the encrypted encoded video data; and outputting a multimedia signal representing the video data while decoding the encoded video data.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the storage device does not store any substantial portion of the encoded video data or the video data. Some embodiments comprise, wherein the video data represents one or more videos, determining a number of the videos stored on the storage device; and transmitting a message to the network, the message representing the number of the videos stored on the storage device. Some embodiments comprise receiving a command to discard one of the videos stored on the storage device; discarding the one of the videos in response to the command; determining the current number of the videos stored on the storage device; and transmitting a message to the network, the message representing the current number of the videos stored on the storage device. In some embodiments, the network comprises the Internet. In some embodiments, the multimedia signal comprises a high-definition television signal. Some embodiments comprise receiving the packets of encrypted encoded video data and first other data from the network; transmitting second other data to the network; transmitting the first other data to a local network; receiving the second other data from the local network; passing the packets of encrypted encoded video data from network to the storage device; and passing the first and second other data between the network and the local network. Some embodiments comprise receiving first voice data from the network; transmitting second voice data to the network; transmitting first analog telephone signals representing the first voice data; and receiving second analog telephone signals representing the second voice data.

In general, in one aspect, the invention features a computer program executable on a processor, comprising: instructions for storing encrypted encoded video data on a storage device, wherein the encrypted encoded video data is received in packets from a network; instructions for retrieving the encrypted encoded video data from the storage device; instructions for decrypting the encrypted encoded video data into encoded video data while retrieving the encrypted encoded video data from the storage device; and instructions for decoding the encoded video data into video data while decrypting the encrypted encoded video data; wherein a multimedia signal representing the video data is outputted while decoding the encoded video data.

In some embodiments, the packets of encrypted encoded video data comprise Internet Protocol packets of the encrypted encoded video data. In some embodiments, the packets of encrypted encoded video data comprise Ethernet packets of the encrypted encoded video data. In some embodiments, the storage device does not store any substantial portion of the encoded video data or the video data. Some embodiments comprise, wherein the video data represents one or more videos, instructions for determining a number of the videos stored on the storage device; and instructions for transmitting a message to the network, the message representing the number of the videos stored on the storage device. Some embodiments comprise discarding one of the videos stored on the storage device in response to a received command; instructions for determining the current number of the videos stored on the storage device; and instructions for transmitting a message to the network, the message representing the current number of the videos stored on the storage device. In some embodiments, the network comprises the Internet. In some embodiments, the multimedia signal comprises a high-definition television signal.

In general, in one aspect, the invention features a business method comprising: providing a list of available encrypted videos; receiving selections of one or more of the encrypted videos from a customer; adding identifiers of the selected encrypted videos to a queue for the customer; receiving an indication of a number of the encrypted videos stored on a storage device associated with the customer; and electronically transmitting one of the encrypted videos having one of the identifiers in the queue to the storage device when the number of the encrypted videos stored on the storage device is less than a predetermined maximum number.

Some embodiments comprise at least one of: billing the customer at regular intervals; and billing the customer for each of the encrypted videos transmitted to the customer. Some embodiments comprise removing an identifier of the one of the encrypted videos from the queue after transmitting the one of the encrypted videos to the storage device.

In general, in one aspect, the invention features a computer program executable on a processor, comprising: instructions for providing a list of available encrypted videos; instructions for adding identifiers of one or more of the encrypted videos to a queue for a customer in response to receiving selections of the one or more of the encrypted videos from the customer; and instructions for electronically transmitting one of the encrypted videos having one of the identifiers in the queue to the storage device when the number of the encrypted videos stored on the storage device is less than a predetermined maximum number.

Some embodiments comprise at least one of: instructions for billing the customer at regular intervals; and instructions for billing the customer for each of the encrypted videos transmitted to the customer. Some embodiments comprise instructions for removing an identifier of the one of the encrypted videos from the queue after transmitting the one of the encrypted videos to the storage device.

The details of one or more implementations are set forth in the accompanying drawings and the description below. Other features will be apparent from the description and drawings, and from the claims.

Figure 1:
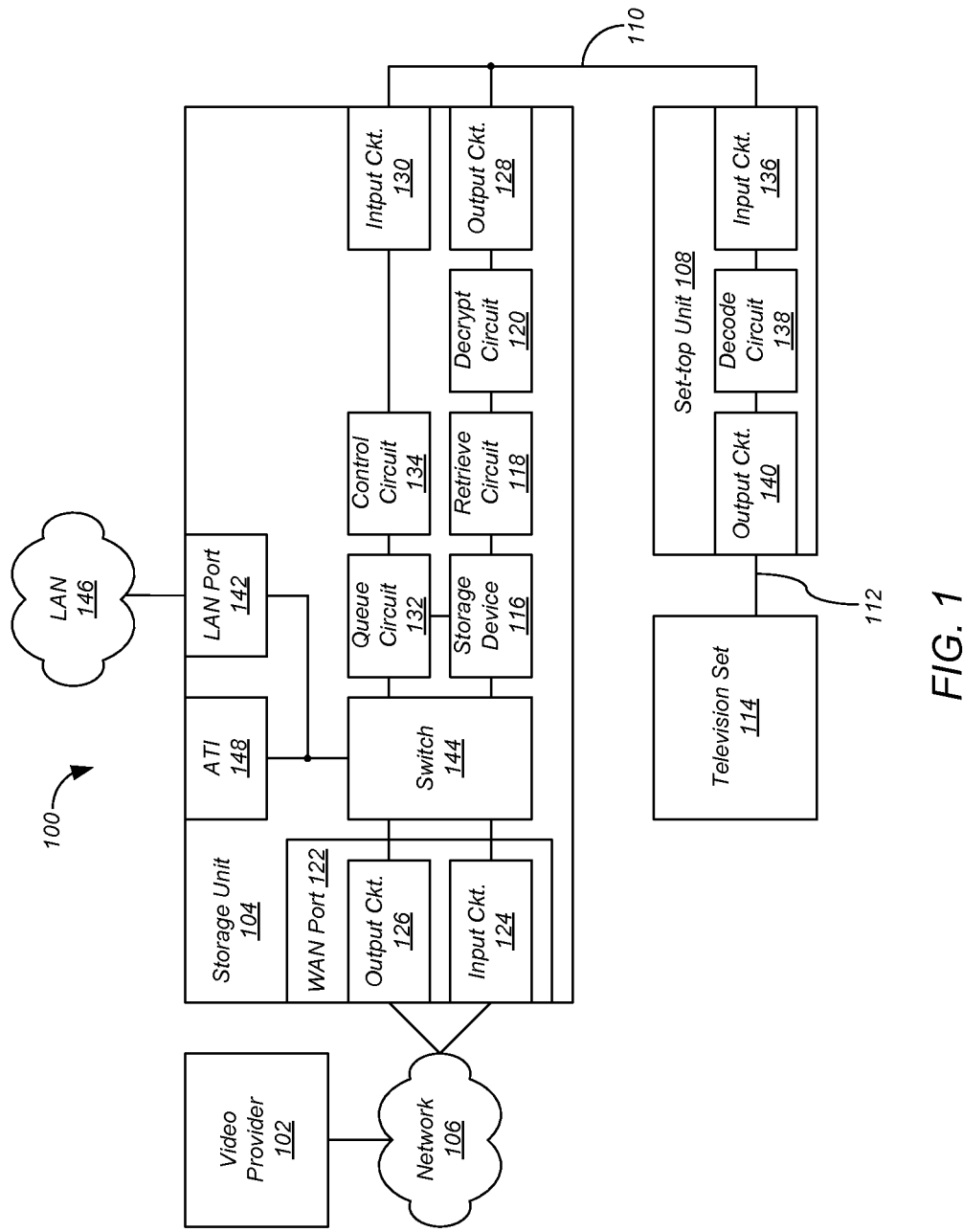
FIG. 1 shows a secure video distribution system comprising a storage unit that transfers encoded video data to a separate set-top unit according to a preferred embodiment of the present invention.

The leading digit(s) of each reference numeral used in this specification indicates the number of the drawing in which the reference numeral first appears.

DETAILED DESCRIPTION

Embodiments of the present invention provide secure video distribution for video such as movies, including high-definition videos. The videos are preferably encoded as video data, and are preferably encrypted before distribution. According to some embodiments, packets of the encrypted encoded video data are received by a storage unit at the customer site, where the encrypted encoded video data is stored on a storage device such as a hard disk drive. When the customer initiates playback of a video stored on the storage device, the encrypted encoded video data is retrieved, decrypted, and transmitted, preferably by a wireless link, to one or more set-top units, which decode the encoded video data and output a multimedia signal for a rendering device such as a television, projector, speaker system, and the like. In some embodiments, the decryption is performed by the set-top unit instead of the storage unit. In still other embodiments, the storage and set-top units are combined as a single customer unit. Preferably none of the units store any substantial portion of the encoded video data or the video data, but store only the encrypted encoded video data to prevent unauthorized duplication and distribution of the video data.

Embodiments of the present invention provide a business method for secure video distribution. According to the method a video provider provides a list of available encrypted videos, receives selections of the encrypted videos from customers, and adds an identifier of each video selected by a customer to a queue for the customer. Each customer is allowed to store a predetermined maximum number of the encrypted videos on a storage device at the customer site. The video provider receives an indication of the number of the encrypted videos stored on each storage device. When the number of the encrypted videos stored on a customer's storage device falls below the customer's predetermined maximum number, for example because the customer has discarded one of the videos, the video provider electronically transmits one of the encrypted videos having an identifier in the customer's queue to the customer's storage device.

FIG. 1 shows a secure video distribution system 100 comprising a storage unit 104 that transfers encoded video data to a separate set-top unit 108 according to a preferred embodiment of the present invention. Secure video distribution system 100 comprises a video provider 102 in communication with storage unit 104 at a customer site over a network 106 such as the Internet. While some embodiments of the present invention are described according to a client-server distribution model, other embodiments can employ peer-to-peer distribution techniques when a sufficient customer base is present.

Storage unit 104 communicates with set-top unit 108 over a link 110 that is preferably wireless. Preferably link 110 is compliant with at least one of IEEE standards 802.11 (1999 Edition), 802.11a-1999 (Supplement to IEEE Std 802.11-1999), 802.11b-1999 (Supplement to IEEE Std 802.11-1999), 802.11g/D8.2 (April 2003, Supplement to IEEE Std 802.11-1999), 802.11n (IEEE P802.11-04/0889r6), 802.16-2004 (Revision of IEEE Std 802.16-2001), and 802.20-PD-06 (IEEE P 802.20 V14, Jul. 16, 2004). In a preferred embodiment, link 110 is a MIMO link compliant with IEEE standard 802.11n. Set-top unit 108 provides a multimedia signal 112 to a television set 114 or one or more other rendering device such as a projector, speaker system, and the like. Multimedia signal 112 is preferably a high-definition television signal such as a HDMI (High-Definition Multimedia Interface) signal, but can be any sort of signal that carries audio and video information to a rendering device.

Storage unit 104 comprises a storage device 116 to store encrypted encoded video data received from video provider 102, a retrieve circuit 118 to retrieve the packets of encrypted encoded video data from storage device 116, and a decrypt circuit 120 to decrypt the encrypted encoded video data. Storage unit 104 also comprises a wide-area network (WAN) port 122 comprising an input circuit 124 to receive the encrypted encoded video data from video provider 102 and an output circuit 126 to transmit messages to video provider 102. Storage unit 104 may also comprise an output circuit 128 to transmit a signal representing the encoded video data over link 110. Storage unit 104 may further comprise an input circuit 130 to receive commands, for example commands received by television set 114 from a remote control (not shown) and relayed by set-top unit 108. Storage unit 104 may also comprise a queue circuit 132 to determine a number of the videos stored on storage device 116, and a control circuit 134 to receive and/or execute commands such as commands received by input circuit 130. The number of videos can represent the total number of videos stored on storage device 116, or can indicate a number of videos added to, or deleted from, storage device 116 or the like. The messages transmitted by output circuit 126 to video provider 102 can include messages indicating the number of videos.

Set-top unit 108 comprises an input circuit 136 to receive the signal representing the encoded video data over link 110, a decode circuit 138 to decode the encoded video data while the input circuit 136 receives the signal representing the encoded video data, and an output circuit 140 to output multimedia signal 112 representing the video data while decode circuit 138 decodes the encoded video data. Preferably neither storage unit 104 nor set-top unit 108 stores any substantial portion of the encoded video data or the video data, but stores only the encrypted encoded video data to prevent unauthorized duplication and distribution of the video data.

In some embodiments storage unit 104 includes a local-area network (LAN) port 142 and a switch 144 to provide communication between a LAN 146 and network 106, and to provide quality of service for different data flows. According to these embodiments, WAN port 122 receives the packets of encrypted encoded video data from network 106, and exchanges other data with network 106. LAN port 142 exchanges data with LAN 146. Switch 144 passes the encrypted encoded video data from WAN port 122 to storage device 116, and passes data between WAN port 122 and LAN port 142.

In some embodiments storage unit 104 includes an analog telephone interface (ATI) 148 and switch 144 to provide voice-over-Internet-Protocol (VOIP) services, and to provide quality of service for different data flows. According to these embodiments, WAN port 122 receives and transmits voice data. Analog telephone interface 148 transmits and receives analog telephone signals representing voice data. Switch 144 passes voice data between the WAN port 122 and analog telephone interface 148.

Preferably storage device 116 is registered to storage unit 104 according to conventional techniques so that storage device 116 will operate only when installed in storage unit 104 to prevent unauthorized duplication and distribution of the video data. For example, each of storage device 116 and storage unit 104 can include read-only memories that contain codes that are compared by control circuit 134. Of course, other techniques can be used to implement the registration.

Figure 2:
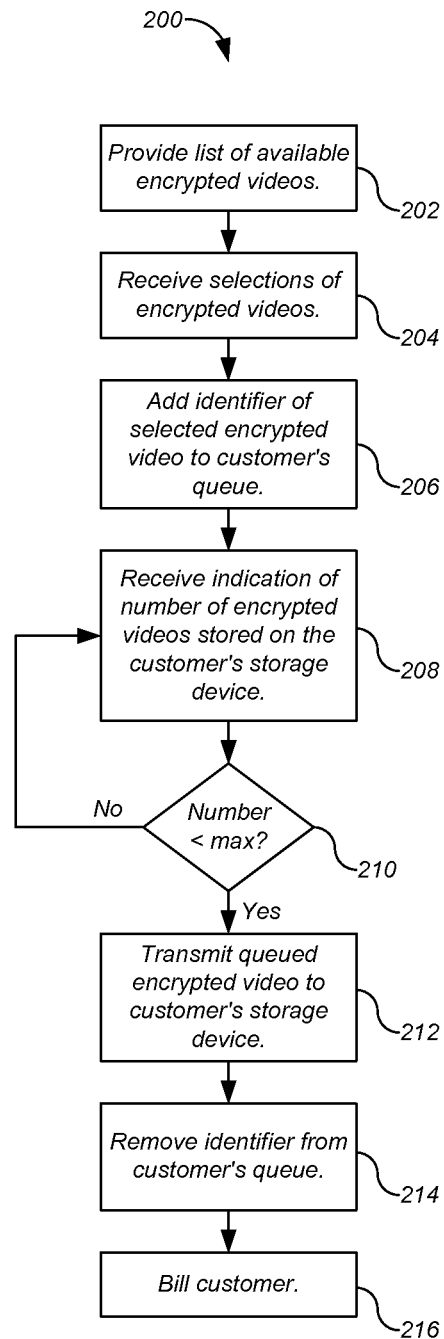
FIG. 2 shows a business method for the video provider of the secure video distribution system of FIG. 1, and for video providers in any of the other secure video distribution systems described herein, according to a preferred embodiment of the present invention.

FIG. 2 shows a business method 200 for video provider 102 of secure video distribution system 100, and for video providers in any of the other secure video distribution systems described herein, according to a preferred embodiment of the present invention. Video provider 102 provides a list of available encrypted videos (step 202). Customers review the list and select one or more of the available encrypted videos, for example using television set 114 and set-top unit 108. Video provider 102 receives the selections (step 204).

Video provider 102 maintains a queue of selected videos for each customer. Each customer can modify the queue, for example by selecting videos, removing videos, or changing the order of the videos in the queue. On receiving a customer selection of a video, video provider 102 adds an identifier of the selected encrypted video to the customer's queue (step 206).

Preferably each customer is only allowed up to a predetermined maximum number of videos at a time. Video provider 102 receives an indication of a number of the encrypted videos stored on the customer's storage device 116 (step 208). When the number of the encrypted videos is less than the predetermined maximum number (step 210), video provider 102 selects one of the encrypted videos having an identifier in the customer's queue, and electronically transmits the encrypted video to the customer's storage device 116 (step 212). Video provider 102 removes the identifier of the encrypted video from the customer's queue after transmitting the encrypted video (step 214). Video provider 102 bills the customer for each encrypted video transmitted to the customer (step 216). Alternatively, video provider 102 bills the customer at regular intervals.

Figure 3:
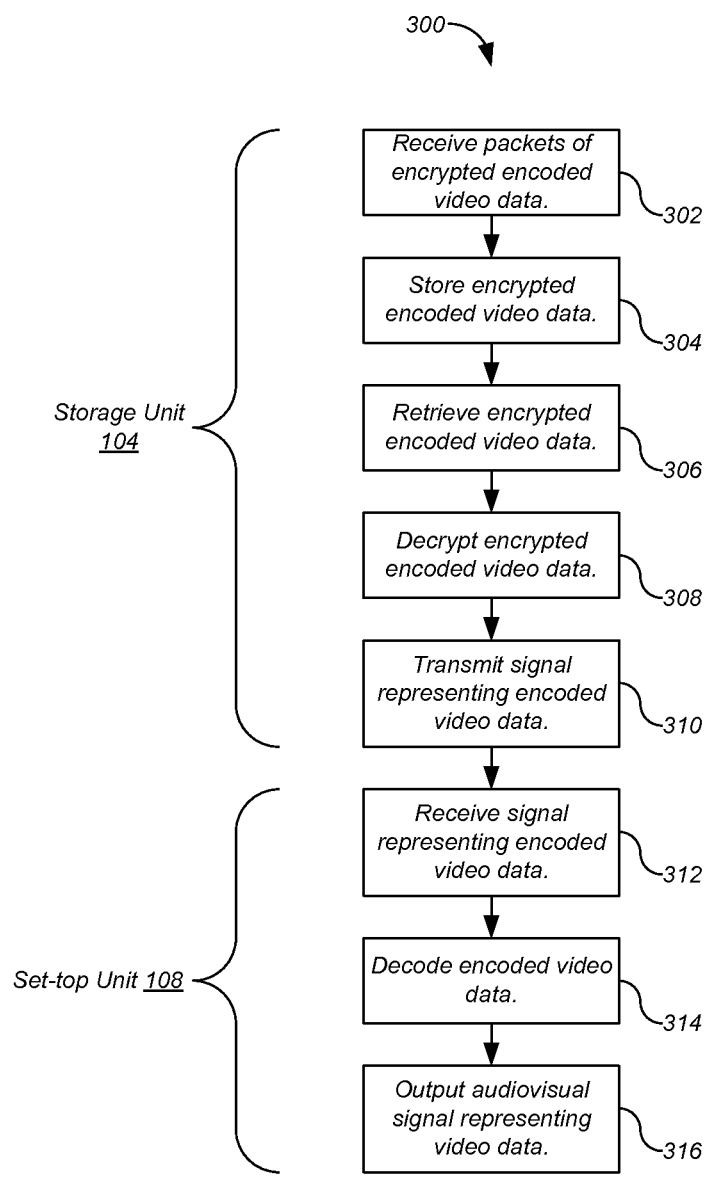
FIG. 3 shows a process for the storage unit and set-top unit of the secure video distribution system of FIG. 1 according to a preferred embodiment of the present invention.

FIG. 3 shows a process 300 for storage unit 104 and set-top unit 108 of secure video distribution system 100 of FIG. 1 according to a preferred embodiment of the present invention. While the steps in FIG. 3 are shown in sequence, the steps preferably overlap substantially in time. Input circuit 124 of WAN port 122 in storage unit 104 receives packets of encrypted encoded video data from network 106 (step 302). In various embodiments, the video data represents one or more videos provided by video provider 102. The packets of encrypted encoded video data can include Internet Protocol packets of the encrypted encoded video data, Ethernet packets of the encrypted encoded video data, and the like.

Storage device 116 of storage unit 104 stores the encrypted encoded video data (step 304). Retrieve circuit 118 of storage unit 104 retrieves the encrypted encoded video data from storage device 116 (step 306), for example in response to a user command to play a video. Decrypt circuit 120 of storage unit 104 decrypts the encrypted encoded video data while retrieve circuit 118 retrieves the encrypted encoded video data from storage device 116 (step 308). Output circuit 128 of storage unit 104 transmits a signal representing the encoded video data over link 110 while decrypt circuit 120 decrypts the encoded video data (step 310). Preferably the signal is a MIMO signal compliant with IEEE standard 802.11n, although of course other sorts of wired, optical, or wireless signals can be used. Preferably storage unit 104 does not store any substantial portion of the encoded video data to prevent unauthorized duplication and distribution of the video data. In some embodiments, the encoding is proprietary so that the transmission over link 110 is secure.

Input circuit 136 of set-top unit 108 receives the signal representing the encoded video data (step 312). Decode circuit 138 of set-top unit 108 decodes the encoded video data while input circuit 136 receives the signal representing the encoded video data (step 314). Output circuit 140 of set-top unit 108 outputs multimedia signal 112 representing the video data while decode circuit 138 decodes the encoded video data (step 316). Multimedia signal 112 is preferably an HDMI signal, but can be any sort of signal that carries audio and video information to a rendering device. Preferably set-top unit 108 does not store any substantial portion of the video data or the encoded video data to prevent unauthorized duplication and distribution of the video data.

Figure 4:
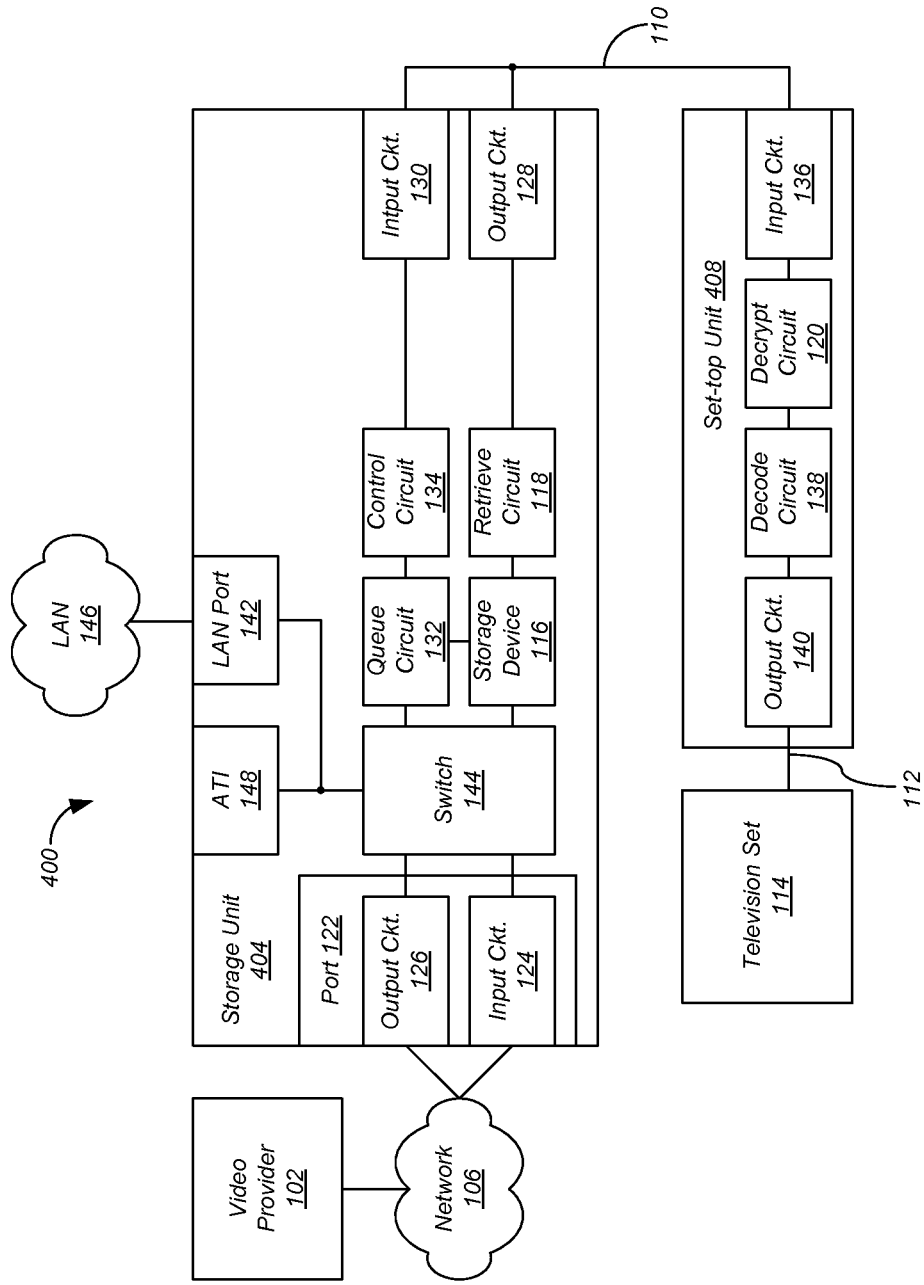
FIG. 4 shows a secure video distribution system comprising a storage unit that transfers encrypted encoded video data to a separate set-top unit according to a preferred embodiment of the present invention.

FIG. 4 shows a secure video distribution system 400 comprising a storage unit 404 that transfers encrypted encoded video data to a separate set-top unit 408 according to a preferred embodiment of the present invention. Secure video distribution system 400 is similar to secure video distribution system 100 of FIG. 1 except that decrypt circuit 120 is located in set-top unit 408 rather than storage unit 404.

Figure 5:
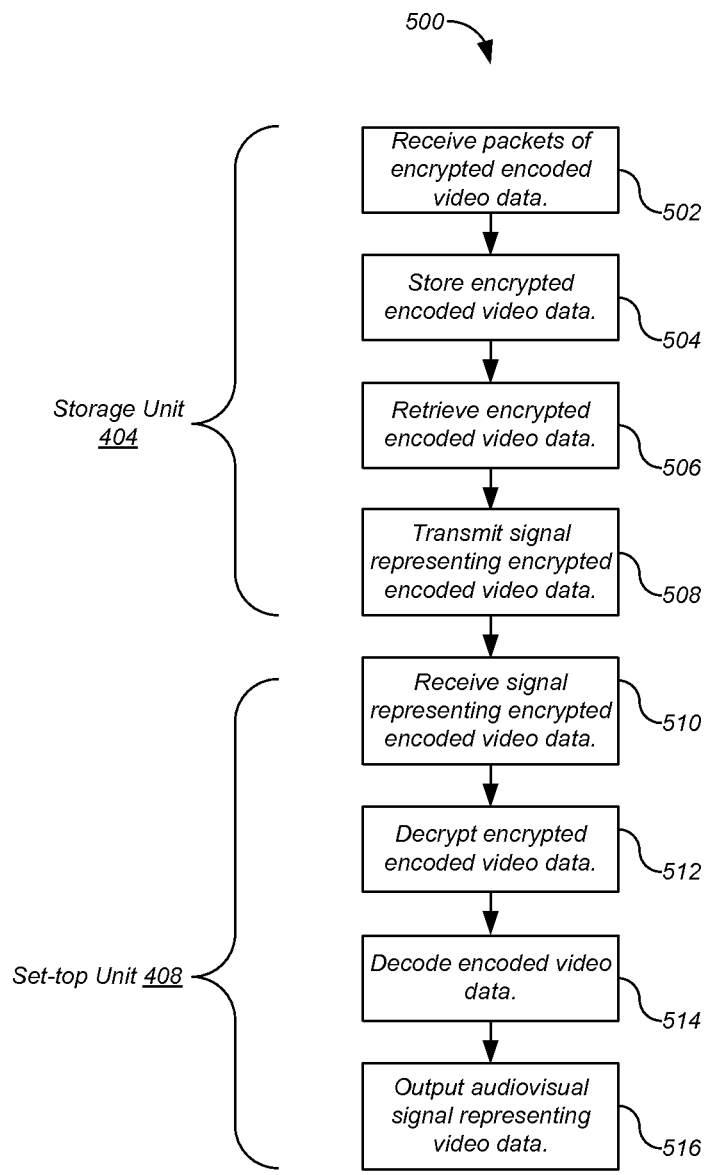
FIG. 5 shows a process for the storage unit and set-top unit of the secure video distribution system of FIG. 4 according to a preferred embodiment of the present invention.

FIG. 5 shows a process 500 for storage unit 404 and set-top unit 408 of secure video distribution system 400 of FIG. 4 according to a preferred embodiment of the present invention. While the steps in FIG. 5 are shown in sequence, the steps preferably overlap substantially in time. Input circuit 124 of WAN port 122 in storage unit 404 receives packets of encrypted encoded video data from network 106 (step 502). In some embodiments, the video data represents one or more videos provided by video provider 102. The packets of encrypted encoded video data can include Internet Protocol packets of the encrypted encoded video data, Ethernet packets of the encrypted encoded video data, and the like.

Storage device 116 of storage unit 404 stores the encrypted encoded video data (step 504). Retrieve circuit 118 of storage unit 404 retrieves the encrypted encoded video data from storage device 116 (step 506), for example in response to a user command to play a video. Output circuit 128 of storage unit 404 transmits a signal representing the encrypted encoded video data over link 110 while retrieve circuit 118 retrieves the encrypted encoded video data from storage device 116 (step 508). Preferably the signal is a MIMO signal compliant with IEEE standard 802.11n, although of course other sorts of wired, optical, or wireless signals can be used.

Input circuit 136 of set-top unit 408 receives the signal representing the encrypted encoded video data (step 510). Decrypt circuit 120 of set-top unit 408 decrypts the encrypted encoded video data while input circuit 136 receives the signal representing the encrypted encoded video data (step 512). Decode circuit 138 of set-top unit 408 decodes the encoded video data while decrypt circuit 120 decrypts the encoded video data (step 514). Output circuit 140 of set-top unit 408 outputs multimedia signal 112 representing the video data while decode circuit 138 decodes the encoded video data (step 516). Multimedia signal 112 is preferably an HDMI signal, but can be any sort of signal that carries audio and video information to a rendering device. Preferably set-top unit 408 does not store any substantial portion of the video data or the encoded video data to prevent unauthorized duplication and distribution of the video data.

Figure 6:
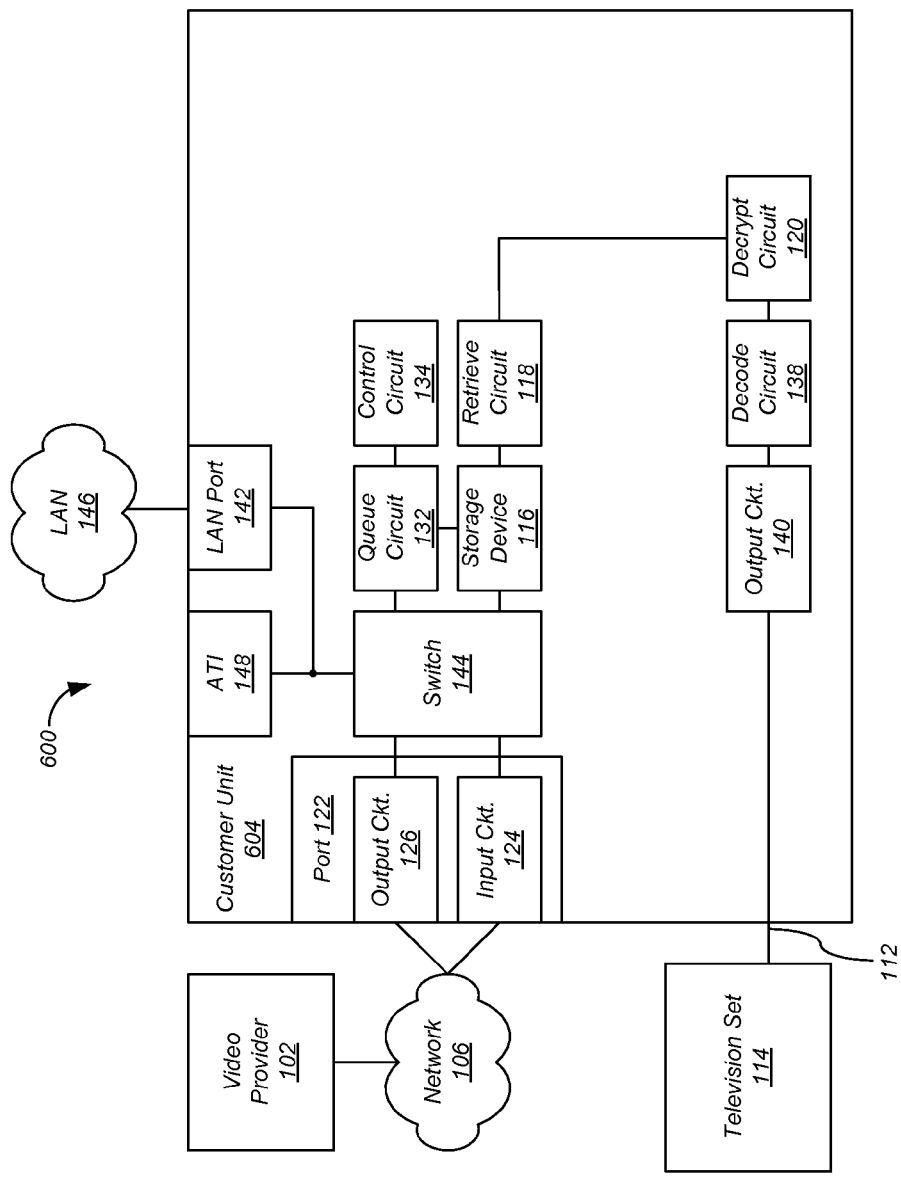
FIG. 6 shows a secure video distribution system where the storage unit and set-top unit are combined into a single unit according to a preferred embodiment of the present invention.

FIG. 6 shows a secure video distribution system 600 where the storage unit and set-top unit are combined into a single customer unit 604 according to a preferred embodiment of the present invention. Secure video distribution system 600 is similar to secure video distribution system 100 of FIG. 1 except that link 110, output circuit 128, and input circuit 136 are not present.

Figure 7:
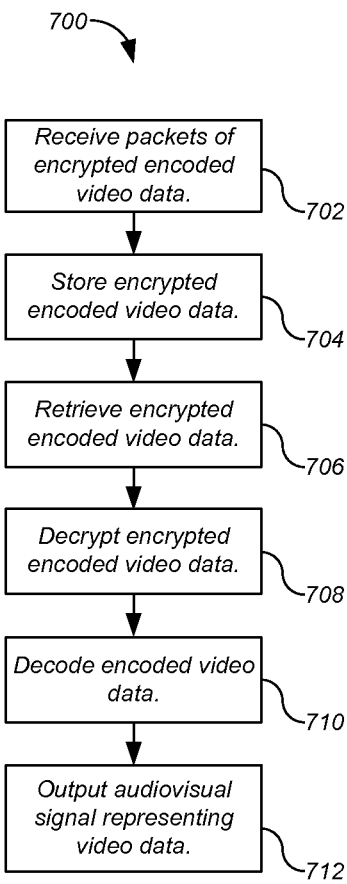
FIG. 7 shows a process for the customer unit of the secure video distribution system of FIG. 6 according to a preferred embodiment of the present invention.

FIG. 7 shows a process 700 for customer unit 604 of secure video distribution system 600 of FIG. 6 according to a preferred embodiment of the present invention. While the steps in FIG. 7 are shown in sequence, the steps preferably overlap substantially in time. Input circuit 124 of WAN port 122 in customer unit 604 receives packets of encrypted encoded video data from network 106 (step 702). In some embodiments, the video data represents one or more videos provided by video provider 102. The packets of encrypted encoded video data can include Internet Protocol packets of the encrypted encoded video data, Ethernet packets of the encrypted encoded video data, and the like.

Storage device 116 of customer unit 604 stores the encrypted encoded video data (step 704). Retrieve circuit 118 of customer unit 604 retrieves the encrypted encoded video data from storage device 116 (step 706), for example in response to a user command to play a video. Decrypt circuit 120 of customer unit 604 decrypts the encrypted encoded video data while retrieve circuit 118 retrieves the encrypted encoded video data from storage device 116 (step 708). Decode circuit 138 of customer unit 604 decodes the encoded video data while decrypt circuit 120 decrypts the encoded video data (step 710). Output circuit 140 of customer unit 604 outputs multimedia signal 112 representing the video data while decode circuit 138 decodes the encoded video data (step 712). Multimedia signal 112 is preferably an HDMI signal, but can be any sort of signal that carries audio and video information to a rendering device. Preferably customer unit 604 does not store any substantial portion of the video data or the encoded video data to prevent unauthorized duplication and distribution of the video data.

Figure 8B:
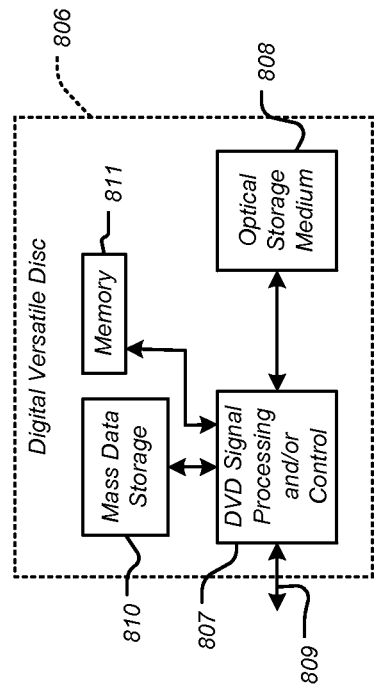
FIGS. 8A-8F show various exemplary implementations of the present invention.
Figure 8A:
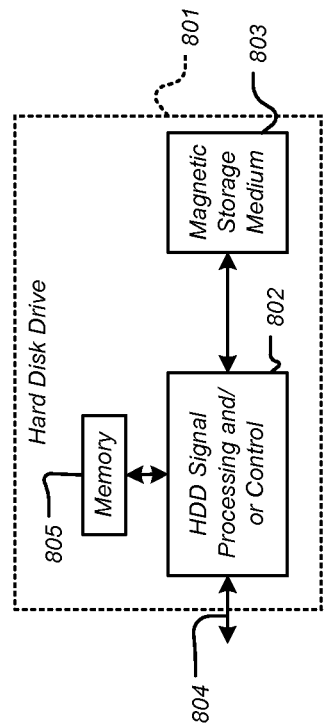

FIGS. 8A-8F show various exemplary implementations of the present invention. Referring now to FIG. 8A, the present invention can be implemented in a hard disk drive (HDD) 801. The present invention may implement either or both signal processing and/or control circuits, which are generally identified in FIG. 8A at 802. In some implementations, the signal processing and/or control circuit 802 and/or other circuits (not shown) in the HDD 801 may process data, perform coding and/or encrypt, perform calculations, and/or format data that is output to and/or received from a magnetic storage medium 803.

The HDD 801 may communicate with a host device (not shown) such as a computer, mobile computing devices such as personal digital assistants, cellular phones, media or MP3 players and the like, and/or other devices via one or more wired or wireless communication links 804. The HDD 801 may include memory 805 such as random access memory (RAM), low latency nonvolatile memory such as flash memory, read only memory (ROM) and/or other suitable electronic data storage.

Referring now to FIG. 8B, the present invention can be implemented in a digital versatile disc (DVD) drive 806 and/or in a mass data storage 810 of the DVD drive 806. The present invention may implement either or both signal processing and/or control circuits, which are generally identified in FIG. 8B at 807. The signal processing and/or control circuit 807 and/or other circuits (not shown) in the DVD drive 806 may process data, perform coding and/or encrypt, perform calculations, and/or format data that is read from and/or data written to an optical storage medium 808. In some implementations, the signal processing and/or control circuit 807 and/or other circuits (not shown) in the DVD drive 806 can also perform other functions such as encoding and/or decoding and/or any other signal processing functions associated with a DVD drive.

The DVD drive 806 may communicate with an output device (not shown) such as a computer, television or other device via one or more wired or wireless communication links 809. The DVD drive 806 may communicate with mass data storage 810 that stores data in a nonvolatile manner. The mass data storage 810 may include a hard disk drive (HDD). The HDD may have the configuration shown in FIG. 8A. The HDD may be a mini HDD that includes one or more platters having a diameter that is smaller than approximately 1.8". The DVD drive 806 may include memory 811 such as RAM, ROM, low latency nonvolatile memory such as flash memory and/or other suitable electronic data storage.

Figure 8C:
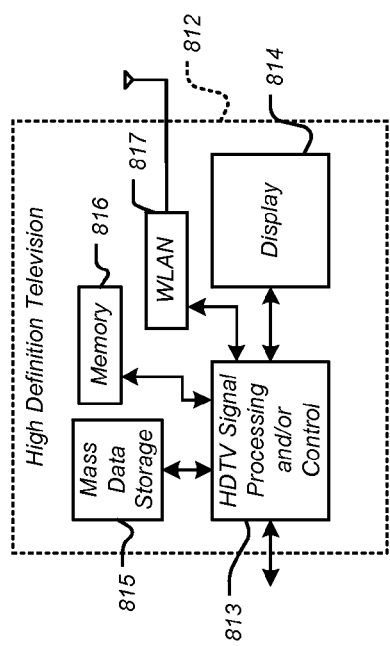

Referring now to FIG. 8C, the present invention can be implemented in a high definition television (HDTV) 812, a WLAN interface 817 of the HDTV 812, and/or a mass data storage 815 of the HDTV 812. The present invention may implement either or both signal processing and/or control circuits, which are generally identified in FIG. 8C at 813. The HDTV 812 receives HDTV input signals in either a wired or wireless format and generates HDTV output signals for a display 814. In some implementations, signal processing circuit and/or control circuit 813 and/or other circuits (not shown) of the HDTV 812 may process data, perform coding and/or encrypt, perform calculations, format data and/or perform any other type of HDTV processing that may be required.

The HDTV 812 may include mass data storage 815 that stores data in a nonvolatile manner such as optical and/or magnetic storage devices. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The HDTV 812 may include memory 816 such as RAM, ROM, low latency nonvolatile memory such as flash memory and/or other suitable electronic data storage. The HDTV 812 also may support connections with a WLAN via a WLAN network interface 817.

Figure 8D:
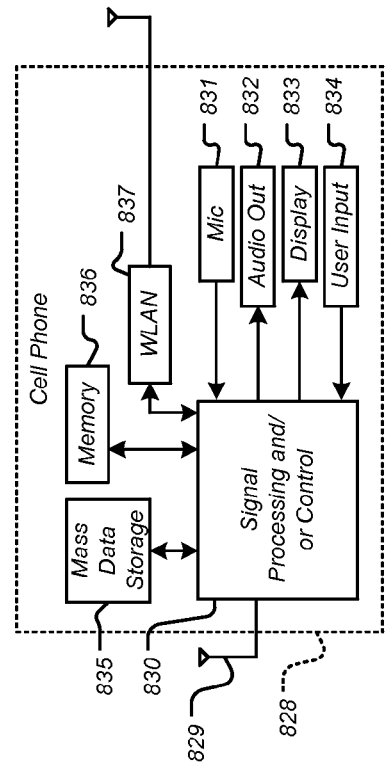

Referring now to FIG. 8D, the present invention can be implemented in a cellular phone 828 that may include a cellular antenna 829, a WLAN interface 837 of the cellular phone 828, and/or a mass data storage 835 of the cellular phone 828. The present invention may implement either or both signal processing and/or control circuits, which are generally identified in FIG. 8D at 830. In some implementations, the cellular phone 828 includes a microphone 831, an audio output 832 such as a speaker and/or audio output jack, a display 833 and/or an input device 834 such as a keypad, pointing device, voice actuation and/or other input device. The signal processing and/or control circuits 830 and/or other circuits (not shown) in the cellular phone 828 may process data, perform coding and/or encrypt, perform calculations, format data and/or perform other cellular phone functions.

The cellular phone 828 may include mass data storage 835 that stores data in a nonvolatile manner such as optical and/or magnetic storage devices including HDDs and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The cellular phone 828 may include memory 836 such as RAM, ROM, low latency nonvolatile memory such as flash memory and/or other suitable electronic data storage. The cellular phone 828 also may support connections with a WLAN via a WLAN network interface 837.

Figure 8E:
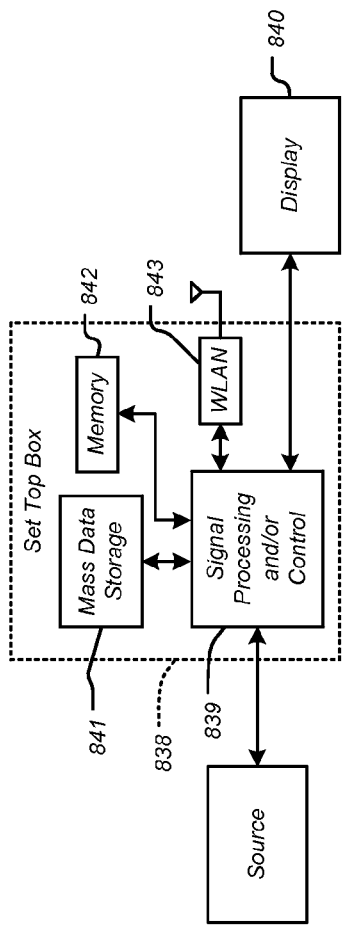

Referring now to FIG. 8E, the present invention can be implemented in a set top box 838, a WLAN interface 843 of the set top box 838, and/or a mass data storage 841 of the set top box 838. The present invention may implement either or both signal processing and/or control circuits, which are generally identified in FIG. 8E at 839. The set top box 838 receives signals from a source such as a broadband source and outputs standard and/or high definition audio/video signals suitable for a display 840 such as a television, a monitor and/or other video and/or audio output devices. The signal processing and/or control circuits 839 and/or other circuits (not shown) of the set top box 838 may process data, perform coding and/or encrypt, perform calculations, format data and/or perform any other set top box functions.

The set top box 838 may include mass data storage 843 that stores data in a nonvolatile manner. The mass data storage 843 may include optical and/or magnetic storage devices including HDDs and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The set top box 838 may include memory 842 such as RAM, ROM, low latency nonvolatile memory such as flash memory and/or other suitable electronic data storage. The set top box 838 also may support connections with a WLAN via a WLAN network interface 843.

Figure 8F:
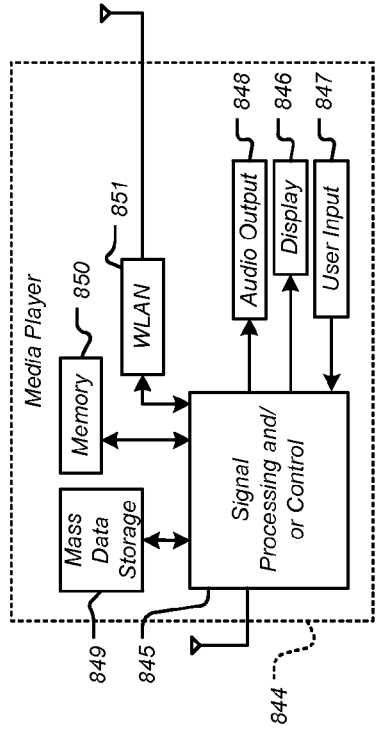

Referring now to FIG. 8F, the present invention can be implemented in a media player 844, a WLAN interface 851 of the media player 844, and/or mass data storage 849 of the media player 844. The present invention may implement either or both signal processing and/or control circuits, which are generally identified in FIG. 8F at 845. In some implementations, the media player 844 includes a display 846 and/or a user input 847 such as a keypad, touchpad and the like. In some implementations, the media player 844 may employ a graphical user interface (GUI) that typically employs menus, drop down menus, icons and/or a point-and-click interface via the display 846 and/or user input 847. The media player 844 further includes an audio output 848 such as a speaker and/or audio output jack. The signal processing and/or control circuits 845 and/or other circuits (not shown) of the media player 844 may process data, perform coding and/or encrypt, perform calculations, format data and/or perform any other media player functions.

The media player 844 may include mass data storage 849 that stores data such as compressed audio and/or video content in a nonvolatile manner. In some implementations, the compressed audio files include files that are compliant with MP3 format or other suitable compressed audio and/or video formats. The mass data storage 849 may include optical and/or magnetic storage devices including HDDs and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". The media player 844 may include memory 850 such as RAM, ROM, low latency nonvolatile memory such as flash memory and/or other suitable electronic data storage. The media player 844 also may support connections with a WLAN via a WLAN network interface 851. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   an input circuit configured to receive packets of encrypted encoded video data from a first network;
   a storage device preauthorized by the first network to store the encrypted encoded video data;
   a retrieve circuit configured to retrieve the encrypted encoded video data from the storage device for decryption;
   a decrypt circuit configured to decrypt the encrypted encoded video data and to generate encoded video data;
   an output circuit configured to transmit a signal representing the encoded video data; and
   a set-top box comprising:
   a further input circuit configured to receive the signal representing the encoded video data from the output circuit;
   a decode circuit configured to decode the encoded video data into video data; and
   a further output circuit configured to output a multimedia signal representing the video data,
   wherein the set-top box does not store a portion of the video data or the encoded video data.

2. The apparatus of claim 1:
   wherein the packets of encrypted encoded video data comprise Internet Protocol packets.

3. The apparatus of claim 1:
   wherein the packets of encrypted encoded video data comprise Ethernet packets.

4. The apparatus of claim 1, wherein the video data represents one or more videos, and the apparatus further comprises:
   a queue circuit configured to determine a number of the videos stored on the storage device; and
   a further output circuit configured to transmit a first message to the first network, the first message representing the number of the videos stored on the storage device.

5. The apparatus of claim 4, further comprising:
   a control circuit configured to receive a command to discard one of the videos stored on the storage device,
   wherein the storage device is configured to discard the one of the videos in response to the control circuit,
   wherein the queue circuit is configured to determine a current number of the videos stored on the storage device, and
   wherein the further output circuit is configured to transmit a second message to the first network, the second message representing the current number of the videos stored on the storage device.

6. The apparatus of claim 1, wherein the first network is implemented using the Internet.

7. The apparatus of claim 1, wherein the multimedia signal comprises a high-definition television signal.

8. The apparatus of claim 1, further comprising:
   a first network port configured to receive the packets of encrypted encoded video data and first other data from the first network, and to transmit second other data to the first network;
   a second network port configured to transmit the first other data to a local network, and to receive the second other data from the local network; and
   a switch configured to pass the packets of encrypted encoded video data from the first network port to the storage device, and to pass the first and second other data between the first and second network ports.

9. The apparatus of claim 8, wherein the first network port is configured to receive first voice data and transmit second voice data, and the apparatus further comprises:
   an analog telephone interface configured to transmit first analog telephone signals representing the first voice data, and to receive second analog telephone signals representing the second voice data,
   wherein the switch is configured to pass the first and second voice data between the first network port and the analog telephone interface.

10. A method comprising:
    receiving packets of encrypted encoded video data from a first network;
    storing the encrypted encoded video data on a storage device preauthorized by the first network to store the encrypted encoded video data;
    retrieving the encrypted encoded video data from the storage device for decryption;
    decrypting the encrypted encoded video data and generating encoded video data;
    transmitting a signal representing the encoded video data from an output circuit;
    receiving, at a set-top box, the signal representing the encoded video data;
    decoding the encoded video data into video data;
    outputting a multimedia signal representing the video data; and
    not storing a portion of the video data or the encoded video data in the set-top box.

11. The method of claim 10:
    wherein the packets of encrypted encoded video data comprise Internet Protocol packets.

12. The method of claim 10:
    wherein the packets of encrypted encoded video data comprise Ethernet packets.

13. The method of claim 10, wherein the video data represents one or more videos, and the method further comprises:
    determining a number of the videos stored on the storage device; and
    transmitting a first message to the first network, the first message representing the number of the videos stored on the storage device.

14. The method of claim 10, further comprising:
    receiving a command to discard one of the videos stored on the storage device;
    discarding the one of the videos in response to the command;
    determining a current number of the videos stored on the storage device; and
    transmitting a second message to the first network, the second message representing the current number of the videos stored on the storage device.

15. The method of claim 10, wherein the first network is implemented using the Internet.

16. The method of claim 10, wherein the multimedia signal comprises a high-definition television signal.

17. The method of claim 10, further comprising:
    receiving the packets of encrypted encoded video data and first other data from the first network;
    transmitting the first other data to a local network;
    receiving second other data from the local network;
    transmitting the second other data to the first network;
    passing the packets of encrypted encoded video data from the first network to the storage device; and
    passing the first and second other data between the first network and the local network.

18. The method of claim 10, further comprising:
    receiving first voice data from the first network;
    transmitting first analog telephone signals representing the first voice data;

receiving second analog telephone signals representing second voice data; and transmitting the second voice data to the first network.

\* \* \* \* \*